(12) United States Patent
Hernández Alonso et al.

(10) Patent No.: US 12,442,095 B2
(45) Date of Patent: Oct. 14, 2025

(54) PHOTOVOLTAIC-ELECTROCHEMICAL (PV-EC) SYSTEM

(71) Applicant: REPSOL, S.A., Madrid (ES)

(72) Inventors: María Dolores Hernández Alonso, Móstoles (ES); Germán Penelas Pérez, Móstoles (ES); Nina Magali Carretero González, Sant Adrià de Besòs (ES); Teresa Andreu ARbella, Sant Adrià de Besòs (ES); Juan Ramón Morante Lleonart, Sant Adrià de Besòs (ES)

(73) Assignee: REPSOL, S.A., Madrid (ES)

( * ) Notice: Subject to any disclaimer, the term of this patent is extended or adjusted under 35 U.S.C. 154(b) by 1039 days.

(21) Appl. No.: 17/046,755

(22) PCT Filed: Apr. 16, 2019

(86) PCT No.: PCT/EP2019/059767
§ 371 (c)(1),
(2) Date: Oct. 9, 2020

(87) PCT Pub. No.: WO2019/201897
PCT Pub. Date: Oct. 24, 2019

(65) Prior Publication Data
US 2021/0115576 A1    Apr. 22, 2021

(30) Foreign Application Priority Data
Apr. 17, 2018 (EP) .................................. 18382257

(51) Int. Cl.
*C25B 15/02* (2021.01)
*C25B 1/04* (2021.01)
(Continued)

(52) U.S. Cl.
CPC ................ *C25B 15/02* (2013.01); *C25B 1/04* (2013.01); *C25B 3/07* (2021.01); *C25B 3/21* (2021.01);
(Continued)

(58) Field of Classification Search
CPC .. C25B 15/02; C25B 1/04; C25B 3/00; C25B 3/25; C25B 3/26; C25B 9/00; C25B 9/01;
(Continued)

(56) References Cited

U.S. PATENT DOCUMENTS 8,123,915 B2 * 2/2012 Richards ................. C25B 13/08
204/266
10,494,724 B2 * 12/2019 Ono ......................... C25B 3/25
(Continued)

FOREIGN PATENT DOCUMENTS

JP   H08296077 A   11/1996
JP   2011143401 A   7/2011

OTHER PUBLICATIONS

Brett et al. (1993). Electrochemistry—Principles, Methods, and Applications—"Corrosion" (p. 353-366) Oxford University Press (Year: 1993).*

(Continued)

*Primary Examiner* — Luan V Van
*Assistant Examiner* — Alexander R. Parent
(74) *Attorney, Agent, or Firm* — Squire Patton Boggs (US) LLP

(57) ABSTRACT

The present disclosure relates to a method of operating an integrated photovoltaic-electrochemical (PV-EC) system, a method for an in situ and continuous removal of byproducts generated and absorbed on the surface of the PV-EC system and the PV-EC system which is able to regenerate its activity in a continuously operable manner.

11 Claims, 9 Drawing Sheets

(51) Int. Cl.
- *C25B 3/07* (2021.01)
- *C25B 3/21* (2021.01)
- *C25B 3/26* (2021.01)
- *C25B 9/19* (2021.01)
- *C25B 9/65* (2021.01)
- *C25B 9/67* (2021.01)
- *C25B 11/032* (2021.01)
- *C25B 11/042* (2021.01)
- *C25B 15/00* (2006.01)
- *C25B 15/08* (2006.01)

(52) U.S. Cl.
CPC .............. *C25B 3/26* (2021.01); *C25B 9/19* (2021.01); *C25B 9/65* (2021.01); *C25B 9/67* (2021.01); *C25B 11/032* (2021.01); *C25B 15/00* (2013.01); *C25B 11/042* (2021.01); *C25B 15/08* (2013.01); *Y02E 10/50* (2013.01)

(58) Field of Classification Search
CPC .. C25B 9/015; C25B 9/05; C25B 9/09; C25B 9/13; C25B 9/15; C25B 9/19; C25B 9/21; C25B 9/50; C25B 9/65; C25B 9/67; C25B 9/73; C25B 9/75; C25B 9/77; C25B 11/031; C25B 11/032; C25B 11/036

See application file for complete search history.

(56) References Cited

U.S. PATENT DOCUMENTS

| | | | |
|---|---|---|---|
| 11,053,597 B2* | 7/2021 | Biener | C25B 15/08 |
| 11,242,603 B2* | 2/2022 | Fleischer | C25B 15/02 |
| 11,248,301 B2* | 2/2022 | Tembhurne | C25B 15/021 |
| 2012/0156577 A1* | 6/2012 | Bulovic | C25B 11/04 205/633 |

OTHER PUBLICATIONS

Sarfraz et al. "Cu—Sn Bimetallic Catalyst for Selective Aqueous Electroreduction of $CO_2$ to CO" ACS Catal. 2016, 6, 2842-2851 (Year: 2016).*

International Search Report and Written Opinion mailed Jul. 5, 2019 for International Application No. PCT/EP2019/059767, 13 pages.

International Preliminary Report on Patentability mailed Jul. 7, 2020 for International Application No. PCT/EP2019/059767, 7 pages.

Agarwal, et al: "Conversion of $CO_2$ to Value-Added Chemicals: Opportunities and Challenges", Handbook of Climate Change Mitigation and Adaptation 2015; Springer Science+Business Media, NY; pp. 1-40; XP055511700.

Rammal: "Electrochemical reduction of $CO_2$ to low-molecular-weight organic molecules", A thesis submitted to the Department of Chemical Engineering at McGill University in partial fulfillment of the requirements of the degree of M. Eng. 2016; pp. I-VIII, 1-112; XP-002785353.

* cited by examiner (A)

(B)

(A)

(B)

PHOTOVOLTAIC-ELECTROCHEMICAL (PV-EC) SYSTEM

CROSS-REFERENCE

This application is a 35 USC 371 national phase filing of PCT/EP2019/059767 filed on Apr. 16, 2019, which claims the benefit of and priority to European Patent Application 18382257.6 filed on Apr. 17, 2018, both applications are incorporated herein by reference in their entirety.

BACKGROUND

Among the most important challenges in electrocatalysis, it is worth highlighting the following: to obtain high efficiency with high production yields (current density, faradaic efficiency, low overpotentials), and to obtain a better energy balance. It should be remarked that frequently the used energy is higher than the obtained energy associated to the wanted products.

Nevertheless, despite the progress made, it is still a challenge to ensure the operation stability of the system and, in particular, the stability of the electrocatalyst, which it is often degraded or poisoned. Thus, for example, in the electrochemical reduction of $CO_2$ to obtain formic acid or other organic compounds, the activity of $CO_2$ conversion of some electrocatalysts (e.g. Pd) can be significantly reduced after a short period of time, due to the adsorption of the poisoning byproduct CO, which blocks the active sites of the electrocatalyst.

Thus, for example, poisoning of Pd catalyst by CO is known in the state of the art, but most of the works related to this catalyst for $CO_2$ reduction try to solve this problem working at very low overpotentials, thus at very low current densities. This approach however, is not useful in industrial terms as the production rate will be very small, and it has been observed that attempts to increase the current density by applying overpotential resulted in $H_2$ production. Other approaches like controlling the Pd nanoparticles surface morphology or size have also been studied, in order to amplify catalytic activity and increase stability to formate production. In this sense, it is clear that the faradic efficiency to formate and stability can be enhanced depending on the crystal morphology but still some degradation with time is observed, and controlled crystallinity for Pd nanoparticles at large scale is not viable.

Therefore, in order to reestablish the activity of the electrocatalyst, it is necessary to regenerate the electrocatalyst, unblocking the poisoned active sites while ensuring the continuity of the electrochemical processes of interest. Frequently used methods for the regeneration of the catalyst consist on its exposure to air or thermal treatments, which either are not suitable methods for a continuous operation, because they will imply disassembling the electrochemical system to recover the catalyst.

In M. Rammal, "Electrochemical reduction of $CO_2$ to low-molecular-weight organic molecules", 2016, M. Eng. Thesis of McGill University, the author describes a comprehensive review of the scientific literature on the electrochemical $CO_2$ reduction. In this document it is highlighted that despite the extensive development in this field, the process remains challenging due to, among others, the deactivation (poisoning) of the electrodes by impurities and reaction intermediates. It is mentioned that one of the effective ways of addressing poisoning is by operating a pulsing technique in which the potential is alternated between a negative value/cathodic bias (to reduce $CO_2$) and a positive value/anodic bias (to breakdown any molecule adhered to the active sites of the catalyst). Nevertheless, this literature review ends stating that it is not evident how the electric charge consumed during the anodic polarization is evaluated in the estimation of energy efficiency; and furthermore, all of the authors who reported on this subject used invariably small size electrodes (1 cm$^2$), and it is not obvious whether their methods are applicable on a practical scale. Also, it is noted that periodic anodic polarization may cause the catalyst to dissolve, which would shorten the life of the electrode (c.f. pages 73-84).

Additionally, Arun S: "Conversion of $CO_2$ to Value-Added Chemicals: Opportunities and Challenges" in "Handbook of Climate Change Mitigation and Adaptation", 2015, Springer New York, ISBN 978-1-4614-6431, it is stated that for commercial viability, it is imperative that electrodes in an electrochemical reactor can be used for up to several thousands of hours without significant loss in activity or selectivity. It is acknowledged that there exists a big gap between the reported lifetime of the electrodes/catalysts and the desired ones. Deactivation of the electrodes has been reported, and different poisoning mechanisms are proposed. Also, there are reported different techniques to mitigate the poisoning effect, such as pulse techniques aimed to desorbing the intermediates, reverse the polarity of applied current, and pre-electrolysis of the electrolyte. Regarding the pulse techniques, it is stated that in the research work, the pulse techniques were applied to a rather small size of electrode (0.28 to 1.0 cm$^2$), and it is unknown whether these methods are applicable on a practical scale. Evaluation on how the electric charge consumed during the anodic polarization is lacking in the estimation of energy efficiency. Furthermore, anodic dissolution of the electrode may occur and shorten the life of the electrode. Most importantly, in this document it is concluded that poisoning of the electrodes should be prevented by means of some chemical methods without using any anodic treatment (c.f. pages 20-21).

DETAILED DESCRIPTION

Figure 1:
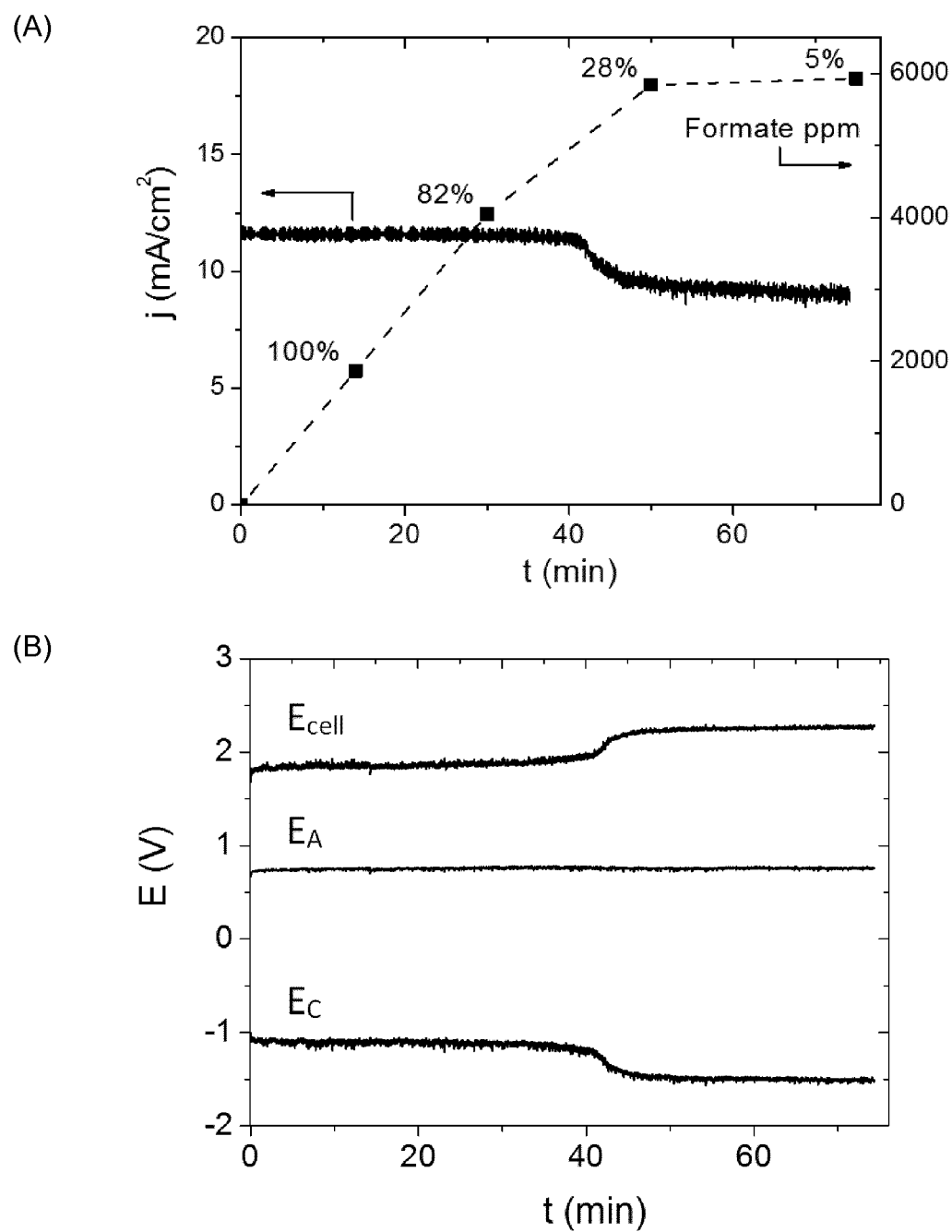
FIG. 1. Bias free $CO_2$ photo-electroreduction. A) Chronoamperometry and formate production. The percentages indicate the faradic efficiency in the time interval; and B) Potentials registered during the Chronoamperometry (A: anode, C: cathode and cell: overall cell).

In a first aspect, a method of operating an integrated photovoltaic-electrochemical (PV-EC) system is provided. The PV-EC system comprises a photovoltaic system (PV) that generates voltage under irradiation and at least one electrochemical cell (EC). The at least one electrochemical cell comprises a cathodic compartment, an anodic compartment and an ion-exchange membrane.

The cathodic compartment comprises a cathodic material which acts as a cathode electrode, and a catholyte; the cathodic material being a conductive electrode with immobilized $CO_2$ reduction electrocatalyst material thereon; the anodic compartment comprises an anodic material which acts as anode electrode, and an anolyte; and the ion-exchange membrane is disposed between the cathodic compartment and the anodic compartment.

In the integrated photovoltaic-electrochemical system, the photovoltaic system is electrically connected to the anode and cathode electrodes for providing a voltage to the at least one electrochemical cell; and the PV-electrode junctions are shielded from the electrolytes.

The method of operating the integrated photovoltaic-electrochemical system comprises alternating a first and a second modes of operation, wherein:
  i. in a first mode of operation, direct EC operation mode, the photovoltaic system provides a first negative voltage to the at least one electrochemical cell, for a first period of time, in order to conduct the electrochemical reduction of $CO_2$; and
  ii. in a second mode of operation, reverse EC operation mode, the photovoltaic system provides a second voltage to the at least one electrochemical cell, with opposite polarity to that of the direct mode, for a second period of time, in order to conduct the desorption and the consequent removal of the byproduct species generated and adsorbed onto the surface of the cathodic material during the direct EC operation mode; being the amplitude of such a second voltage of opposite polarity at least the minimum necessary to desorb the byproduct species generated and adsorbed during the direct EC operation mode.

In a second aspect, it is provided a method for an in situ and continuous removal of byproduct species generated and adsorbed on the surface of the cathodic material of an integrated photovoltaic-electrochemical (PV-EC) system, operating to conduct the electrochemical reduction of $CO_2$. In this second aspect, the integrated photovoltaic-electrochemical system comprises a photovoltaic system (PV) that generates a voltage under irradiation, and at least one electrochemical cell (EC); the at least one electrochemical cell comprising
  i) a cathodic compartment which comprises a cathodic material which acts as a cathode electrode, and a catholyte; the cathodic material being a conductive electrode with immobilized $CO_2$ reduction electrocatalyst material thereon;
  ii) an anodic compartment which comprises an anodic material which acts as a anode electrode, and an anolyte; and
  iii) an ion-exchange membrane disposed between the cathodic compartment and the anodic compartment;
the photovoltaic system being electrically connected to the anode and cathode electrodes for providing a voltage to the at least one electrochemical cell; wherein the PV-electrode junctions are shielded from the electrolyte; and the method comprising alternating, in the form of pulses of opposite polarity voltage, a direct EC operation mode and a reverse EC operation mode as defined above.

In the first mode of operation, direct EC operation mode, the photovoltaic system provides a first negative voltage to the at least one electrochemical cell, for a first period of time, in order to conduct the electrochemical reduction of $CO_2$; and in the second mode of operation, reverse EC operation mode, the photovoltaic system provides a second voltage to the at least one electrochemical cell, with opposite polarity to that of the direct mode, for a second period of time, in order to conduct the desorption and the consequent removal of the byproduct species generated and adsorbed onto the surface of the cathodic material during the direct EC operation mode; being the amplitude of such a second voltage of opposite polarity at least the minimum necessary to desorb the byproduct species generated and adsorbed during the direct EC operation mode.

In a third aspect, an integrated photovoltaic-electrochemical (PV-EC) system is provided. The PV-EC system comprises a photovoltaic system (PV) that generates voltage under irradiation and at least one electrochemical cell (EC); wherein the PV-EC system is capable to regenerate its activity in a continuously operable manner.

The PV-EC system herein disclosed is able to provide the inversion of polarity to the at least one electrochemical cell for the regeneration of the electrocatalyst while maintaining an efficient solar to fuel conversion.

The introduction of pulses in the electrocatalytic processes allows controlling the reaction performance with the goal of increasing the reaction selectivity towards preferential products; while improving the energy transformation balance which is a key parameter when the electrochemical process is applied to produce solar fuels using $CO_2$ as feedstock.

In accordance with the herein disclosed methods and system, it is achieved the control of the adsorption and desorption of byproducts coming from the electrochemical promoted reactions on the electrocatalyst in an electrochemical cell, while maintaining a high effective solar to fuel transformation. Furthermore, the methods and system of the present disclosure, allow supplying both the anodic and cathodic potentials directly from the captured solar energy, thus avoiding the use of external bias and, hence, using the sun as the only energy source in order to improve as much as possible the energy transformation balance.

In the methods and system of the present disclosure, the attention has been focused on improving the energy balance, which is an essential parameter in the electrochemical production of solar fuels from $CO_2$ reduction in an electrochemical system where a light-driven electrochemical reaction takes place. The total cell polarization, $V_{cell}$, which is provided by a PV system, defines the overall efficiency in transforming solar energy into fuels, SFT. Faradaic efficiency (FE) is kept as high as possible over time in order to have a high production.

The total cell polarization, as contribution of both the anodic, Ea, and cathodic potentials, $E_c$, together with the duty cycle, are relevant parameters for the production of hydrocarbon from $CO_2$ as well as for the selectivity to reduction products. Depending on the chemical reaction kinetics taking place on the anode and cathode, $E_a$, $E_c$ and duty cycle values may control the possible formation of an oxide layer, the desorption of previously adsorbed hydrogen atoms or the desorption of the intermediate CO species.

The methods and system of the present disclosure allow to use the same photon absorbing structure (photovoltaic system) both to produce the carriers required for the electrochemical desired reaction in the direct EC operation mode and to regenerate the surface of the electrocatalyst, by electrically switching the polarity in the reverse EC operation mode.

These electrical impulses, once its polarization, amplitude, and width are set, leads to restoring the activity of the electrocatalyst, avoiding in this way its deactivation and consequently, ensuring its operation at maximum efficiency.

In the context of the present disclosure, the expression "integrated photovoltaic-electrochemical system" refers to a photoelectrochemical device, which comprises one or more electrochemical cells (EC) electrically connected therebetween, that is voltage-biased with at least one photovoltaic cell (PV) constituting a photovoltaic system, wherein the PV system is electrically connected to the working and counter electrodes of the EC device for providing a voltage to the EC; and wherein the PV-electrode junctions are shielded from the electrolyte.

In the context of the present invention, the expression "integrated photovoltaic-electrochemical system" refers to a system wherein a photovoltaic PV system and a electrochemical EC device are combined together in a more efficient way in a single device, resulting in a PV-EC system wherein the PV and the EC device are working in a coordinated manner, benefiting from each other, and where such integration differs from the mere electrical connection between the two elements. Besides expected reduction of capital costs, the integration of the system allows operating under solar radiation in an autonomous mode, leading to a complete independence, modularity and portability in such a way that, in order to increase production, multiplication of the number of modules is the only requirement. In an electrolyzer connected to a solar field, for example, increasing the productivity will lead to a resizing of the photovoltaic capacity. Furthermore, integration minimizes losses due to electric transport since distance between the PV and electrolyzer is non-significant. Integration allows also optimizing the operating point of the device considering the Intensity-Voltage curves of both the photovoltaic and the electrochemical components, enabling the possibility of an ad-hoc sizing and optimization of the elements depending of the application and reaction of interest. This will lead to a higher total efficiency of the process.

Figure 9:
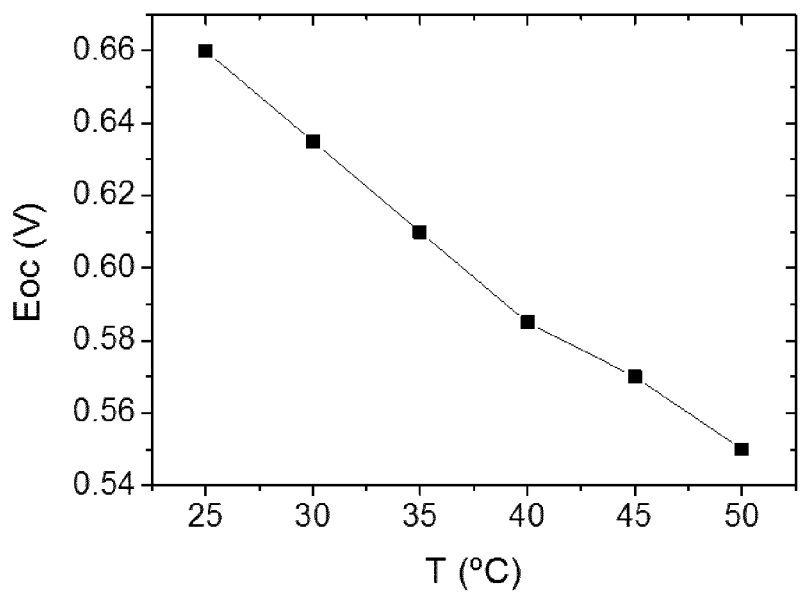
FIG. 9. Temperature effect on the open circuit potential of the PV cell.
Figure 10:
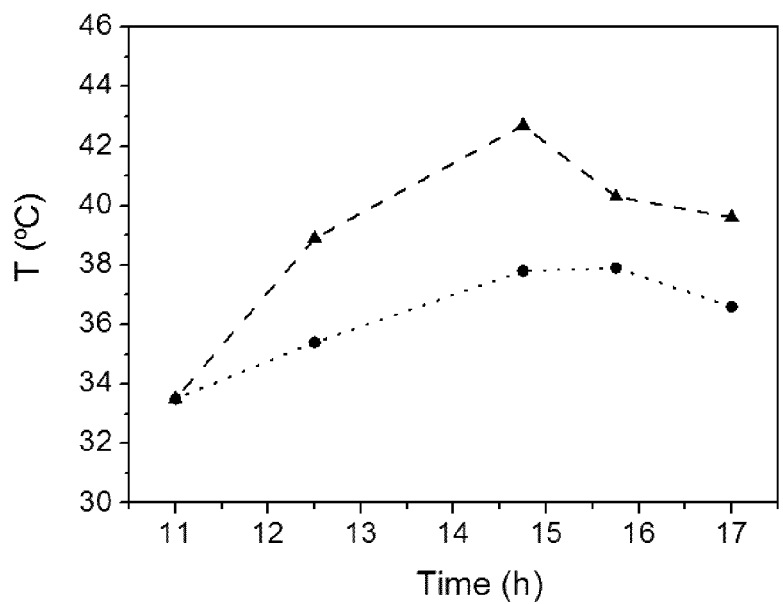
FIG. 10. Differences observed with time in the temperature outside the cell (triangles) and inside the cell with electrolyte recirculation (dots), showing the beneficial effect of the integration.

In addition, an unexpected advantage of integration leads to a higher efficiency of the system due to a cooling effect of electrolyte flow. It is known that the efficiency of solar cells decreases as temperature increases. In this case, integration of the cell has proven to be beneficial since temperature decreased when electrolyte flows through the system (c.f. FIG. 9 and FIG. 10).

The PV system may be constituted of at least one photovoltaic cell. When constituted by more than one cells, cells may be wired in series in order to obtain higher voltage while maintaining the current, or connected in parallel to obtain higher current while maintaining the voltage.

In accordance with the methods and system of the present disclosure, release of adsorbed byproduct species from the surface of the electrocatalyst at the cathode of the electrochemical system, takes place in situ and in a continuous mode, i.e. without necessity of disassembling the electrochemical system and thus, ensuring the continuity of the electrochemical process.

In the context of the present invention, the expression in situ and continuous mode is referred to the fact that regeneration and production takes place in the system, with an ongoing and steady progress prolonged in time and without the need of stop/star the production during the regeneration step and without dismantling the system, coupling two different operating modes in such a way that production stays in time. Optimization of the duty cycle makes this possible, allowing the utilization of high efficiency catalysts that suffers strong deactivation under normal operation conditions, and makes possible to operate in a continuous mode, maintaining a high efficiency while avoiding deactivation. Furthermore, system operates in an autonomous mode, being able to work using only the solar radiation reaching the system. This ensures continuous operation of the system at maximum efficiency.

The reverse EC operation mode guarantees the electrocatalyst performance working in the direct EC operation mode. The overall energy supplied by the PV system obtained from the sun, to both direct and reverse operation modes, gives rise to a better energy balance of the solar to fuel conversion process mode.

It is known that, in an electrochemical process, some byproduct species may be adsorbed on the surface of the electrocatalyst at the electrodes, thus resulting in the loss of electrocatalytic activity of the electrode.

Therefore, the method of operating an integrated PV-EC system according to the present disclosure may be used to regenerate the electrocatalytic activity of the cathode, after being diminished as a consequence of poisoning due to the presence of byproduct species generated during the electrochemical reduction of $CO_2$.

Thus, for example, during $CO_2$ reduction process in an electrochemical cell, $CO_2$ is reduced on the cathode while the oxygen evolution reaction takes place on the anode; the most common reduction reactions are:

$$CO_2 + H^+ + 2e^- \rightarrow HCOO^-$$

$$CO_2 + 2H^+ + 2e^- \rightarrow CO + H_2O$$

$$CO_2 + 6H^+ + 6e^- \rightarrow CH_3OH + H_2O$$

$$CO_2 + 8H^+ + 8e^- \rightarrow CH_4 + 2H_2O$$

The main product of the electrochemical $CO_2$ reduction depends on the used electrocatalyst present in the cathode. In any case, high current densities are necessary to increase the productivity and to maximize the formation of hydrocarbons. As a consequence, a fast deactivation of the electrocatalytic material may be observed in these conditions. The common electrocatalysts used suffer from insufficient stability and durability, because the electrocatalyst active sites become gradually poisoned by reaction intermediates and byproducts blocking them.

Therefore, in accordance with an embodiment of the present disclosure, the process that takes place during the reverse EC operation mode is the desorption of the byproduct species, generated and adsorbed on the surface of the electrocatalyst present in the cathode, during the desired reaction which takes place in the direct EC operation mode.

The main byproduct species generated during the electrochemical reduction of $CO_2$ that may deactivate the catalyst are CO and CO-derived species, for example, metal carbonyls. Therefore, in accordance with a preferred embodiment, the reverse EC operation mode is the desorption of the byproduct species derived from CO formation.

As noted above, in accordance with some embodiments of the method of operation of the present disclosure, the desired reaction is the electrochemical reduction of $CO_2$. Thus, in the direct EC operation mode, the photovoltaic system provides a negative voltage for a first period of time to the electrochemical system in order to conduct the electrochemical reduction of $CO_2$. The parameters of operation of this direct mode of operation, such as total cell voltage amplitude, may be selected so that the desired reaction occurs with high faradic efficiency and high current density.

It is highlighted that the method according to the present invention is fully applicable on an industrial-scale system with favorable global energy efficiency. In the examples herein described, the electrode size is 10 cm², demonstrating the method is fully applicable on a practical scale.

Catalysts for electrochemical reduction of $CO_2$ are classified into several groups based on the nature of the primary product obtained, and may be selected from:
  i) a metal with a high overpotential to hydrogen evolution, low CO adsorption and high overpotential for $CO_2$ to $CO_2$ radical ion; selected from the group consisting of Pb, Hg, In, Sn, Cd, TI and Bi;
  ii) a metal with a medium overpotential to hydrogen evolution and low CO adsorption; selected from the group consisting of Au, Ag, Zn, Pd and Ga;
  iii) a metal with a high CO adsorption and a medium overpotential to hydrogen evolution; which is Cu;
  iv) a metal with a relatively low overpotential to hydrogen evolution and a high CO adsorption, selected from the group consisting of Ni, Fe, Pt, Ti, V, Cr, Mn, Co, Zr, Nb, Mo, Ru, Rh, Hf, Ta, W, Re, and Ir;
  v) an oxide of any of the metals of i), ii), iii) or iv) type; and
  vi) combinations thereof using different techniques such as co-deposition technologies, electrochemical, physical or chemical based processes or using multicomponent particles.

In accordance with some embodiments, the catalyst material for $CO_2$ reduction may be deposited on a conductive support. In some embodiments, the support may be a highly porous and conductive support material such as carbon paper, carbon based nanofibers, metallic meshes and metal foams.

In accordance with some embodiments of the present invention, the cathode is a porous and conductive material, such as gas-diffusion electrodes (GDE), containing an immobilized catalyst material. In accordance with particular embodiments, the immobilized catalyst material is selected from any one of those mentioned above on the groups i)-vi).

In accordance with some examples, the immobilized catalyst material of the cathode is selected from the group consisting of Sn, Pb, Hg, Bi, In, Cd, TI, Au, Ag, Zn, Pd, Ga, Ni, Fe, Pt, Ti, Ru, Cu, an oxide of any of these metals and combinations thereof.

In some embodiments, the immobilized catalyst material of the cathode is selected from the group consisting of Au, Ag, Zn, Pd, Ga, Ni, Fe, Pt, Ti, Ru, Cu, an oxide of any of these metals and combinations thereof. In some particular examples, the immobilized catalyst material of the cathode is selected from the group consisting of Au, Ag, Pd, Ru, Cu, CuO, $Cu_2O$, and combinations thereof.

In accordance with some embodiments, the anode may include an oxygen evolution catalyst (OER), such as Ir, CoFe, Co-Pi, Ni, Ni—Fe, or any other adequate oxygen evolution reactive to promote the reaction of oxidation of water.

In accordance with the methods of the present disclosure, the PV system operates to provide, during the direct EC operation mode, a negative voltage for a first period of time; and to provide, during a reverse EC operation mode, an opposite polarity voltage to that of the direct mode, for a second period of time; being the amplitude of such a second voltage of opposite polarity at least the minimum necessary to desorb the byproduct species generated and adsorbed during the direct EC operation mode.

In some preferred embodiments of the present disclosure, the direct EC operation mode and the reverse EC operation mode alternates in the form of pulses of voltage of opposite polarity. Furthermore, the method may take place in situ and in a continuous form.

In the context of the present disclosure, the duty cycle (θ) is the fraction of the period in which the signal or system is operating in direct EC mode.

Thus, the duty cycle (θ) may be expressed as:

$$\theta = (t_{direct\ mode}/t_{cycle}) \times 100$$

where θ is the duty cycle, $t_{direct\ mode}$ is the time the system works in direct EC mode operation within a pulse cycle and $t_{cycle}$ is the total duration of the cycle.

In some embodiments, the duty cycle may be comprised from 99.9 to 65% in order to maintain a high solar to fuel conversion efficiency. In some other embodiments, the duty cycle may be comprised from 99 to 67%; in some examples according to the present disclosure, the duty cycle may be comprised from 98.5 to 69%. In some other examples, the duty cycle may be comprised from 95 to 70%. In additional examples, the duty cycle may be comprised from 99.9 to 75%; 99.9 to 80%; 99.9 to 85%; or 99.9 to 90%.

Therefore, the direct and reverse EC operation modes alternate, (i.e. the reverse operation mode may be considered as a pulse of opposite polarity) wherein the voltage, current density and duration of pulses (width) are controlled in such a way that the reactivation of the electrocatalyst in the PV-EC system takes place.

In accordance with an embodiment of the present disclosure, in order to optimize the characteristics of voltage, current density and duration of the pulses (width) of opposite polarity (i.e. during the reverse EC operation mode), it may be necessary to know different aspects of the electrochemical system, such as the specific active surface of the electrocatalyst, and the electrochemical conditions (e.g.

minimum oxidative voltage) needed for the electrochemically desorption of the poisonous products to take place.

The voltage, provided by the PV system depends on the intrinsic properties of the photovoltaic cell, although it can be modified by varying the number of PV elements connected in series. In addition, the pulse of opposite polarity (i.e. reverse EC operation mode) may be maintained during a minimal period of time (width) in order to ensure the total conversion/desorption of all the poisonous products deactivating the catalyst (i.e. byproduct species adsorbed on the surface of the cathode).

Control of parameters such as anodic potencial (Ea), cathodic potential (Ec) and duty cycle has been observed to, depending on the chemical reaction kinetics taking place on both anode and cathode, influence the selectivity of the $CO_2$ reduction reaction. In particular the polarization of the cathode (Ec value) can modify the chemical reaction taking place in the electroreduction of $CO_2$ according to the used catalyst. Thus, in accordance with some embodiments, wherein the catalyst materials of the cathode are selected from the group consisting of Pb, Hg, In, Sn, Cd, Tl, Bi, Au, Ag, Zn, Pd, Ga, Ni, Fe, Pt, Ti, Ru, Cu, an oxide of any of these metals and combinations thereof, the total cell voltage amplitude required to induced the desired cathode polarization (Ec) for both the direct EC mode ($CO_2$ electroreduction) and reverse EC mode (catalyst regeneration), and the period of time of application of the reverse EC operation mode (pulse width), may vary depending on the catalyst properties; but generally the total cell voltage amplitude may be comprised from 1.5V to 5V. In some examples, the total cell voltage amplitude may be comprised from 1.8V to 4.8V; in some other examples it may be comprised from 2V to 4.5V. In particular examples, the total cell voltage amplitude may be comprised from 1.5V to 4.5V; in other examples it may be comprised from 1.5V to 4V.

Specifically, in accordance with the embodiments of the present invention, the polarization of the cathode (Ec) at the applied cell voltage is the parameter determining the required total cell voltage amplitudes for both direct and reverse operation modes.

In a preferred embodiment of the present invention, the PV-EC system operates in a bias-free mode without the external contribution of energy coming from a power supply.

In accordance with the second aspect of the present disclosure, a method for an in situ and continuous removal of byproduct species adsorbed on the electrocatalyst surface of the cathode electrode of an electrochemical system is provided.

In the context of the present invention, in relation with this second aspect, the direct EC operation mode of the PV-EC system refers to the photovoltaic system providing a negative voltage, for a first period of time to the electrochemical cell in order to conduct the $CO_2$ reduction reaction with the required cathode polarization (Ec).

Voltage pulses of opposite polarity are also supplied by the photovoltaic system having the required total cell voltage amplitude and width, to provide the positive cathode polarization (Ec) required to reactivating the electrocatalyst in the electrode.

In accordance with a preferred embodiment of this second aspect of the invention, the voltage pulses of opposite polarity are supplied for an adequate pulse duration, in such a way that the duty cycle may be comprised from 99.9 to 65% in order to maintain a high solar to fuel conversion efficiency. In some other embodiments, the duty cycle may be comprised from 99 to 67%; in some examples according to the present disclosure, the duty cycle may be comprised from 98.5 to 69%. In some other examples, the duty cycle may be comprised from 95 to 70%. In additional examples, the duty cycle may be comprised from 99.9 to 75%; 99.9 to 80%; 99.9 to 85%; or 99.9 to 90%.

As mentioned above, the cathode may be a conductive electrode with immobilized electrocatalyst and the anode may contain an oxygen evolution reaction (OER) electrocatalyst. Therefore, the method for an in situ and continuous removal of byproduct species generated and adsorbed on the surface of the electrocatalyst in the cathode of an electrochemical system, according to the present disclosure, may be used to regenerate the catalytic activity of the electrocatalyst on the cathode electrode of the EC, wherein the catalytic activity of the electrocatalyst has been reduced as a consequence of the adsorption on the surface of the electrocatalyst byproduct species generated during the electrochemical reduction of $CO_2$. In accordance with some embodiments, the byproduct species generated and adsorbed on the surface of the electrocatalyst during the direct EC operation mode are selected from CO and CO-derived species such as metal carbonyls.

In accordance with some embodiments of the invention, the PV-EC system comprises a photovoltaic (PV) system that generates voltage under irradiation and at least one electrochemical cell (EC); the at least one electrochemical cell comprises i) a cathodic compartment which comprises a cathodic material which acts as a cathode electrode and a catholyte; the cathodic material may be a conductive electrode with immobilized $CO_2$ reduction electrocatalyst material thereon; ii) an anodic compartment which comprises an anodic material which acts as a anode electrode and an anolyte; and an ion-exchange membrane disposed between the cathodic compartment and the anodic compartment. The photovoltaic system being electrically connected to the anode and cathode electrodes for providing a voltage to the at least one electrochemical cell; wherein the PV-electrode junctions are shielded from the electrolyte. In the PV-EC system of the present disclosure, the at least one photovoltaic system may be operable to provide during a first mode of operation, direct EC operation mode, the required negative voltage to the at least one electrochemical cell, for a first period of time, in order to conduct the electrochemical reduction of $CO_2$; and further it may be operable to provide during a second mode of operation, reverse EC operation mode, a second voltage to the at least one electrochemical cell, with opposite polarity to that of the direct mode, for a second period of time, in order to conduct the desorption and the consequent removal of the byproduct species generated and adsorbed on the surface of the cathodic material during the direct EC operation mode; being the amplitude of such a second voltage of opposite polarity at least the minimum necessary to desorb the byproduct species generated and adsorbed during the direct EC operation mode.

In some embodiments, the cathodic material is a conductive material with immobilized $CO_2$ reduction electrocatalyst material, and the anodic material is a conductive material with an OER electrocatalyst.

In some embodiments of the present disclosure, in the PV-EC system, the cathodic compartment further comprises a cathode support frame comprising the cathodic material; at least one distribution frame; and one or more sealing gaskets.

In some embodiments, in the PV-EC system, the anodic compartment further comprises an anode support frame comprising the anodic material; at least one distribution frame; and one or more sealing gaskets.

In some embodiments, in the PV-EC system, the fluid distribution frames and sealing gaskets are arranged such that in use they allow introducing a catholyte or anolyte into the cathodic or anodic compartment through an inlet port and they allow exiting the catholyte or anolyte, respectively, and the products jointly through an outlet port.

In accordance with some embodiments of the present disclosure, the PV-EC device comprises a filter-press type electrochemical cell and a photovoltaic system. The electrochemical cell contains an anode, comprising an oxygen evolution reaction (OER) electrocatalysts, a cathode, for example a gas diffusion electrode (GDE), containing a carbon dioxide reduction electrocatalyst, and with an ion exchange membrane (e.g. Nafion) interpose between the anodic and cathodic compartments for gas-phase electrocatalytic reduction of $CO_2$. The photovoltaic system is constituted by at least one photovoltaic cell.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

Throughout the description and claims the word "comprise" and variations of the word, are not intended to exclude other technical features, additives, components, or steps. Furthermore, the word "comprise" encompasses the case of "consisting of". Additional objects, advantages and features of the invention will become apparent to those skilled in the art upon examination of the description or may be learned by practice of the invention. The following examples and drawings are provided by way of illustration, and they are not intended to be limiting of the present invention. Furthermore, the present invention covers all possible combinations of particular and preferred embodiments described herein.

EXAMPLES

Experimental Procedure

The designed integrated photovoltaic-electrochemical cell (PV-EC) was used for the photoelectrochemical reduction of $CO_2$ to formic acid, produced in the electrolyte in the form of formate.

Preliminary electrochemical experiments, under no irradiation, have been performed in order to characterize the electrochemical system and determine the operation conditions for both direct and reverse operation modes. This includes the selection of the requirements that the photovoltaic system must meet.

The photoelectrochemical experiments were carried out under bias-free conditions, thus the applied voltage between anode and cathode was only supplied by the photovoltaic system.

The photoelectrochemical cell was irradiated using a solar simulator Solar Light 16S equipped with a 300W Xe-lamp and AM 1.5G filter. Current density and electrode potentials were measured using a Biologic potentiostat.

For the quantification of the formate faradaic efficiencies, the $CO_2$ reduction experiments were conducted in 20 mL of catholyte, taking aliquots of 2 mL in different controlled times and calculating the total charge accumulated. The product in the liquid phase was analyzed, after acidification, using a UV-Vis Detector set at 210 nm.

Following examples were performed following the general experimental procedure as described above. The following examples have been done in a filter-press type electrochemical cell, with the cathode and anode connected to a photovoltaic system (photovoltaic-electrochemical, PV-EC, system). The cathode electrodes were prepared using Gas Diffusion Electrodes (GDE) of C-Toray and drop casting Pd/C (Pd nanoparticles on Vulcan XC-72 carbon black, Premetek Co.), the anode was a commercial DSA (Dimensionally Stable Anode) and the membrane used was Nafion N-117. In all the examples the anolyte was NaOH 1M and the catholyte $NaHCO_3$ 0.5M+NaCl 0.5 M+$CO_2$ saturated. To follow the cathode and anode potentials, a reference electrode Ag/AgCl (KCl sat.) was used, allocated in the cathodic compartment. Size of anode and cathode electrodes was 10 cm$^2$.

For the quantification of formate and faradaic efficiencies for the $CO_2$ electroreduction experiments, aliquots of the catholyte were taken in different time intervals, and analyzed after acidification, using an UV-vis Detector set at 210 nm.

In these examples, the direct EC operation mode relates with the $CO_2$ electroreduction and the reverse EC operation mode with the pulses of opposite polarity applied to regenerate the catalyst.

Example 1. $CO_2$ Photoelectrochemical Reduction to HCOO— with Catalyst Poisoning The experiment was performed under bias free conditions, using a photovoltaic system providing a photovoltage of 2.3 V approximately. The results are shown in FIG. 1.

FIG. 1A shows the current density for the $CO_2$ reduction reaction in bias free conditions, formate production and faradic efficiency (FE) for this product. The formate FE is high at the beginning (more than 80%) but decays after 40 minutes, indicating that other byproducts are being produced instead. Also the current density decays, associated with an increase in the cathode potential and thus, an increase in the overall cell potential, as can be observed in FIG. 1B. Both the decrease in current density and the increase in cathode potential are associated with the deactivation of the active centers of the catalyst mainly by CO, a byproduct of the reduction reaction.

To demonstrate that the decrease in the FE to formate is related with the production of other byproducts, the electrochemical cell was coupled with a gas chromatography equipment and a similar experiment was performed. Under the same experimental conditions, a potential of −1,9 V was applied to the cathode for 2 h, and the gases were measured at the exit of the cell. The results are shown in FIG. 2.

Figure 2:
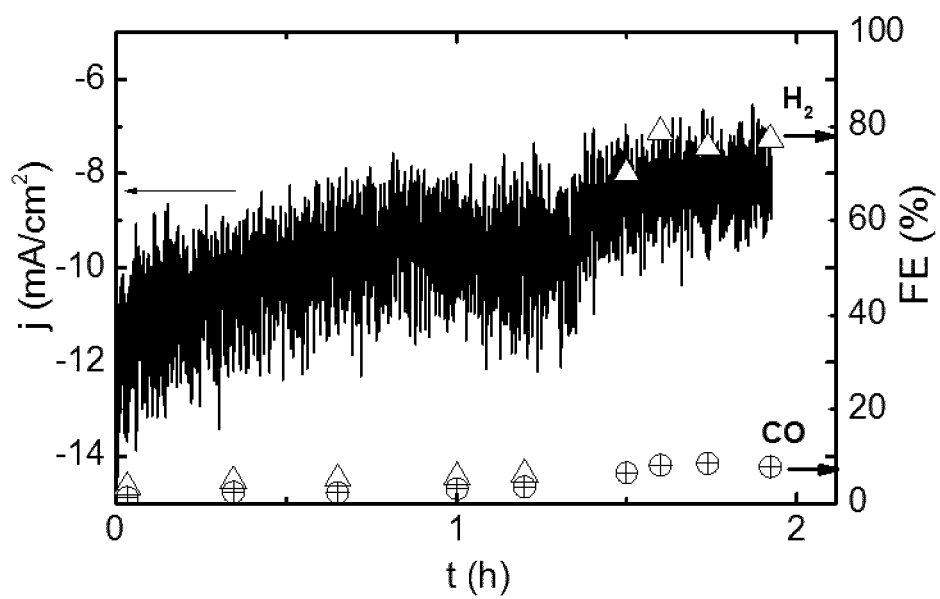
FIG. 2. Chronoamperometry at −1,9 V during $CO_2$ electroreduction. Current density (j) of the system during the electroreduction experiment and faradic efficiency (FE) of gas products, $H_2$ and CO.

In FIG. 2, it is observed how along the first operation hour the amount of CO and $H_2$ is insignificant and coincides with the preferential formation of formate, thus the catalyst is active for this product. After 90 minutes, the current density decreases and the $H_2$ is the major product. Along this stage, also CO formation is observed, corresponding to near 10% of FE.

Figure 3:
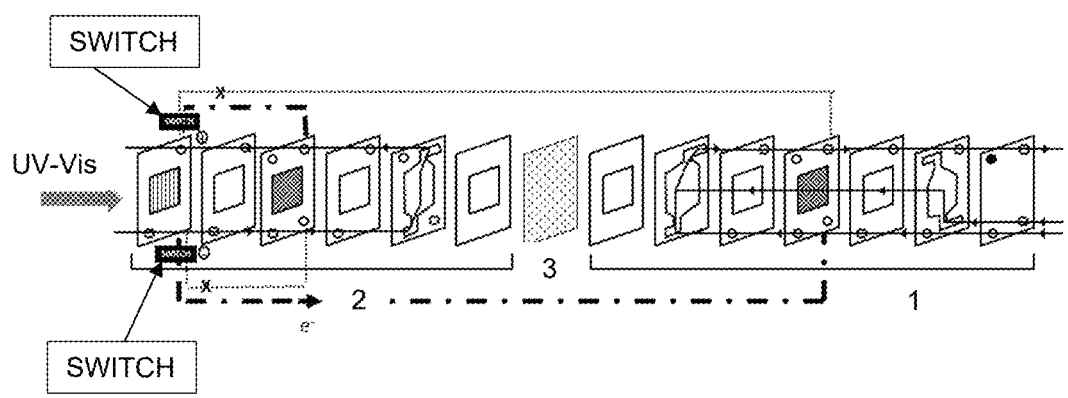
FIG. 3. Diagram of the photovoltaic-electrochemical cell for $CO_2$ reduction to HCOO— (Direct EC operation mode). Electrical connections to the photovoltaic system during the main $CO_2$ reduction step: i) Dotted lines represent closed connections and ii) hyphen-dot lines represent open connections. 1: cathodic compartment; 2: anodic compartment and 3: membrane.
Figure 4:
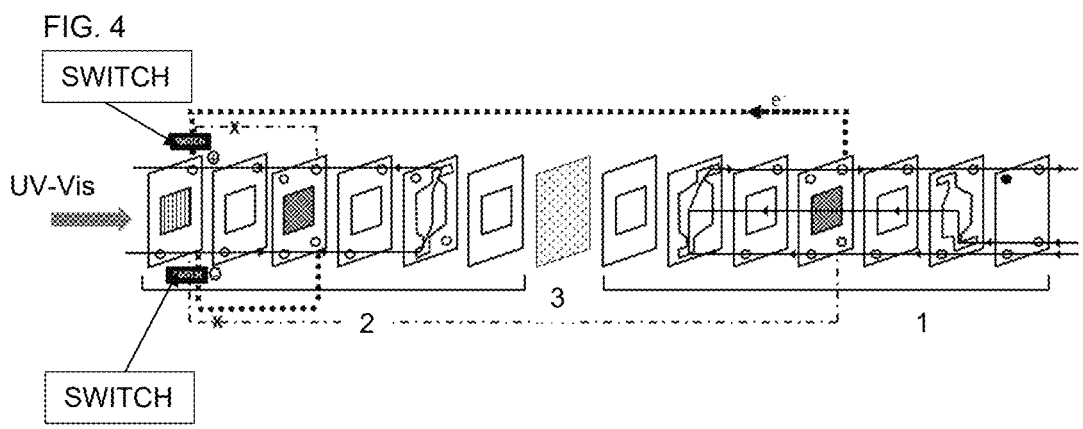
FIG. 4. Diagram of the photovoltaic-electrochemical cell for $CO_2$ reduction to HCOO— (Reverse EC operation mode). Electrical connections to the photovoltaic system during the reactivation of the catalyst by application of opposite polarity pulses: i) Dotted lines represent open connections and ii) hyphen-dot lines represent closed connections. 1: cathodic compartment; 2: anodic compartment and 3: membrane.

Example 2. Bias Free $CO_2$ Photo-Electroreduction to HCOO— with Opposite Polarity Pulses for the Catalyst Auto-Regeneration FIGS. 3 and 4 show the diagram of the photovoltaic-electrochemical system used for the experiments, for continuous and bias free $CO_2$ conversion to formate. For the proof of concept, 5 channels of a potentiostat were used, with the objective of monitoring the potential changes in cathode and anode and, at the same time, being able to restrict the current density if needed, according to the pulses alternation. However, this system is complex due to the large number of channels used and a more simple system is being considered, based in programmed switches.

Figure 5:
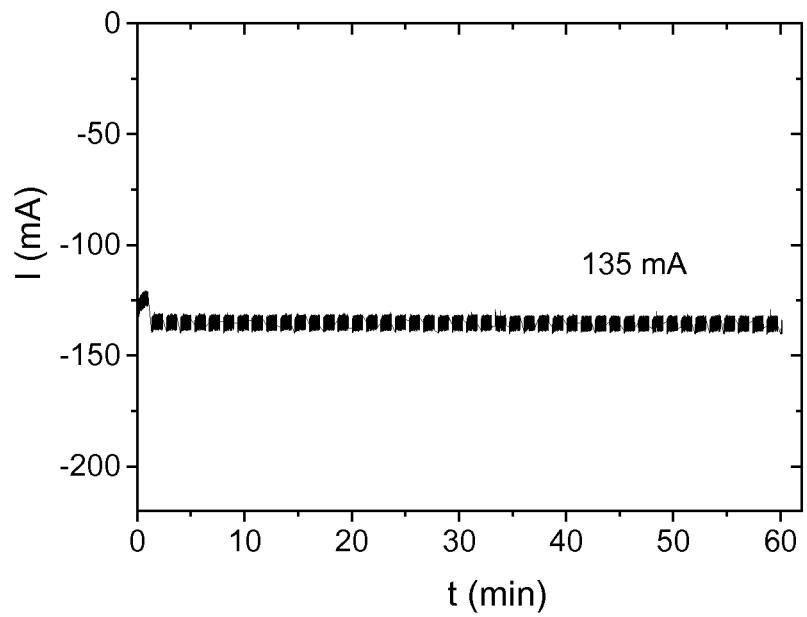
FIG. 5. Bias free $CO_2$ photo-electroreduction with catalyst auto-regeneration by application of opposite polarity pulses (25 s width) every 1 minute. Photovoltaic system of 2,3 V photovoltage. A) Chronoamperometry; and B) Potentials registered during the Chronoamperometry (A: anode, C: cathode and cell: overall cell).
Figure 5:
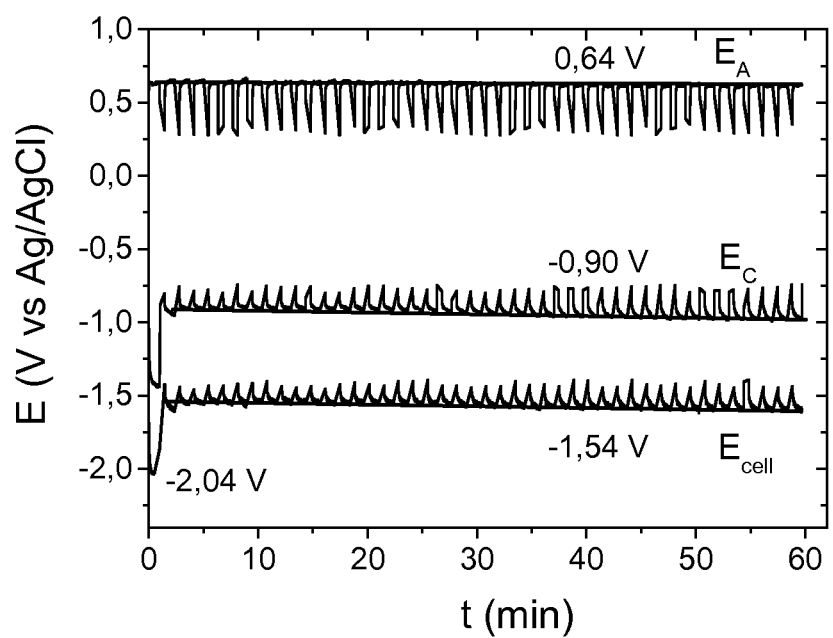

FIG. 5 shows the results obtained for the photovoltaic-electrochemical system, working in a continuous and bias free operation. The direct EC mode of operation ($CO_2$ reduction to formate) is conducted in one minute intervals and, continuously, the polarity of the system is reversed ($V_{oc} \approx 2.3V$) by 25 second-width pulses in order to regenerate the catalyst surface by desorption of the CO blocking the active centers. After one hour operation time, the formate concentration was 4427.5 ppm, which corresponds with a faradic efficiency of 87%.

Figure 6:
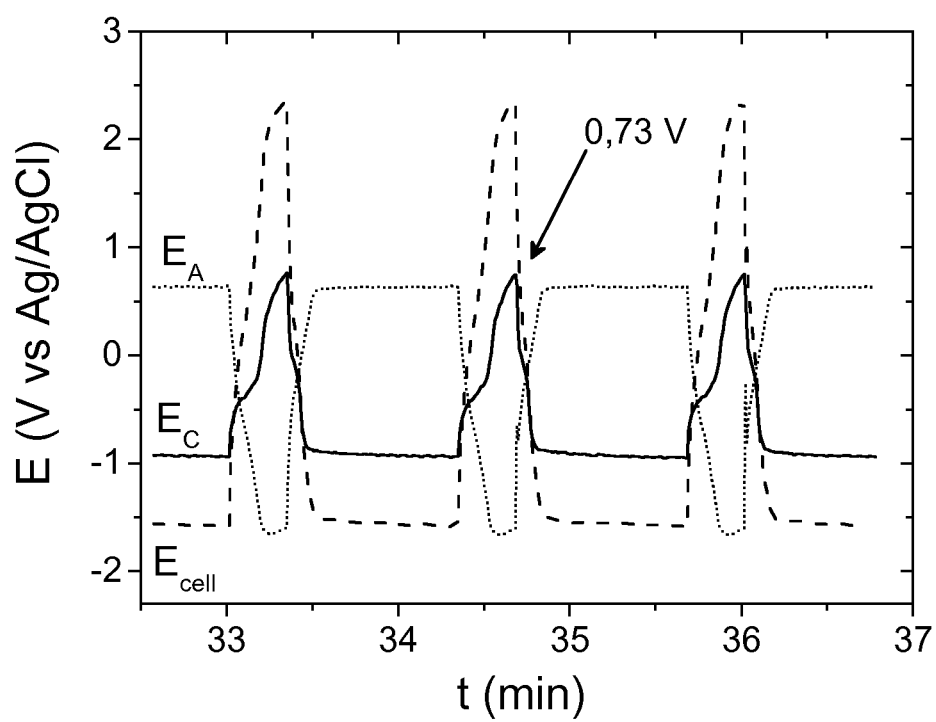
FIG. 6. Bias free $CO_2$ photo-electroreduction with catalyst auto-regeneration by application of opposite polarity pulses (25 s width) every 1 minute. Anode (A), Cathode (C) and overall cell (cell) potentials registered during the pulses application.

In FIG. 6, the potential change in the cathode and anode during the pulse application are shown. The cathode potential during the Direct EC operation mode is around −1 V vs Ag/AgCl, but the 25 s-width positive pulse reverts this negative potential up to +0.73 V. This voltage is enough to induce the desorption of the CO from the catalyst surface and the catalyst remains stable during the $CO_2$ reduction, as the high FE to formate reveals after one hour, no anodic dissolution of the electrode is observed.

Figure 7:
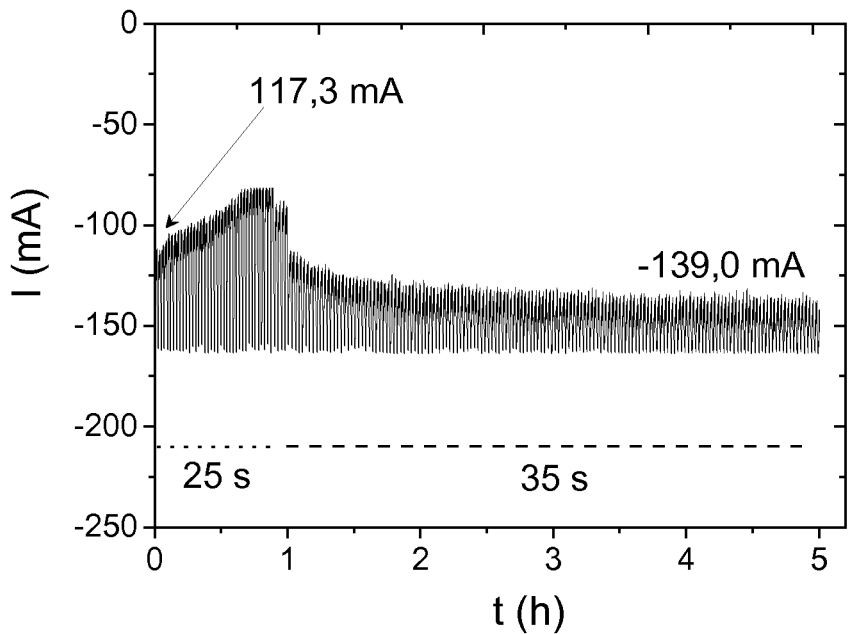
FIG. 7. Bias free $CO_2$ photo-electroreduction with catalyst auto-regeneration by application of opposite polarity pulses (25 s and 35 s width) every 1 minute. Photovoltaic system of 1.8 V photovoltage. A) Chronoamperometry; and B) Potentials registered during the Chronoamperometry (A: anode, C: cathode and cell: overall cell).
Figure 7:
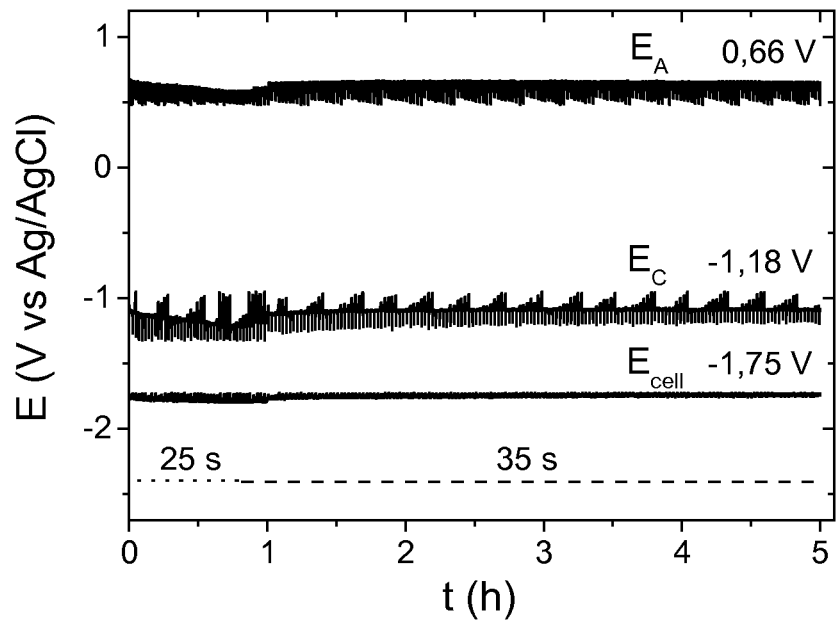
Figure 8:
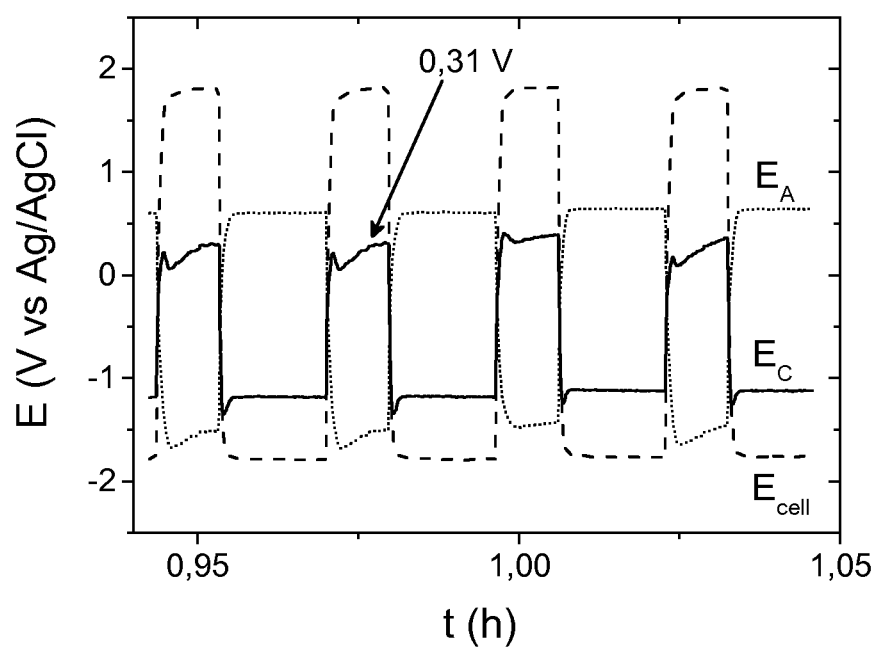
FIG. 8. Bias free $CO_2$ photo-electroreduction with catalyst auto-regeneration by application of opposite polarity pulses (35 s width) every 1 minute. Anode (A), Cathode (C) and overall cell (cell) potentials registered during the pulses application.

Comparative Example 1. Bias Free $CO_2$ Photo-Electroreduction to HCOO— with Opposite Polarity Pulses, which Doesn't Allow the Catalyst Auto-Regeneration As a counter example, FIG. 7 shows the same bias free experiment shown in Example 2, but using a photovoltaic system providing a lower photovoltage ($V_{oc} \approx 1.8V$). In this case, the application of 25 seconds-width positive pulses is not enough to regenerate the catalyst as it can be observed by the gradual decrease in the current density. After 45 minutes of operation, the pulse width was increased up to 35 seconds, obtaining the stabilization of the current density at 139 mA. However, although the current density is stable after the pulse duration increase, the overall working cell potential is higher than in the previous example. The formate production after the first hour in bias free operation is 894.2 ppm, which corresponds to a faradic efficiency of 21%. Thus, in this case, although the pulses application modifies the cathode potential and stabilizes the current density, is not enough for complete catalyst regeneration. These results reveal the necessity of a minimum voltage applied to the cathode during the positive pulse to perform the CO desorption and reactive the catalyst and thus, the requirement of selecting the adequate photovoltaic element to be integrated in the system FIG. 8 shows the potential change in the cathode and anode during the pulse application. The cathode potential during the direct EC operation mode is around −1.2 V vs Ag/AgCl, but the 35 s-width positive pulse reverts this negative potential up to +0.31 V. However, as demonstrated above, the photovoltage provided by this photovoltaic system is not enough to regenerate the catalyst and thus, +0.31 V is a low voltage for CO to desorb.

The invention claimed is:

1. A method of operating a photovoltaic-electrochemical (PV-EC) system comprising a photovoltaic system (PV) that generates a voltage under irradiation, and at least one filter-press type electrochemical cell (EC), the at least one electrochemical cell comprising:
   i) a cathodic compartment which comprises a cathodic material which acts as a cathode electrode and a catholyte, the cathodic material being a conductive electrode with immobilized $CO_2$ reduction electrocatalyst material thereon;
   ii) an anodic compartment which comprises an anodic material which acts as an anode electrode and an anolyte; and
   iii) an ion-exchange membrane disposed between the cathodic compartment and the anodic compartment;
   the photovoltaic system being electrically connected to the anode and cathode electrodes of the at least one electrochemical cell for providing a voltage to the at least one electrochemical cell;
   wherein electrical connections between the photovoltaic system and the anode and cathode electrodes of the at least one electrochemical cell are configured to alternate, in the form of pulses of opposite voltage, of a first and a second mode of operation;
   wherein PV-electrode junctions are shielded from the catholyte and anolyte;
   the method comprises:
   removing byproduct species generated and absorbed on a surface of the cathodic material of the photovoltaic-electrochemical (PV-EC) system while operating to conduct electrochemical reduction of $CO_2$, by alternating, in the form of pulses of opposite polarity voltage of the first and the second mode of operation, wherein:
   a) the first mode of operation, direct EC operation mode, comprises providing, by the photovoltaic system, a first negative voltage to the at least one electrochemical cell, for a first period of time, in order to conduct the electrochemical reduction of $CO_2$; and
   b) the second mode of operation, reverse EC operation mode, comprises providing, by the photovoltaic system, a second voltage to the at least one electrochemical cell, with opposite polarity to that of the direct EC operation mode, for a second period of time, in order to conduct a desorption and consequent removal of the byproduct species generated and adsorbed onto the surface of the cathodic material during the direct EC operation mode; an amplitude of the second voltage of the opposite polarity being at least a minimum amplitude necessary to desorb the byproduct species generated and adsorbed during the direct EC operation mode;
   wherein the second voltage of the opposite polarity are supplied for a pulse duration resulting in a duty-cycle comprised from 99.9 to 65%;
   wherein the method takes place in situ and in a continuous mode;
   wherein the photovoltaic system (PV) and the electrochemical cell (EC) are combined together in a single device, and
   wherein the catholyte flows through both the PV and EC components of the photovoltaic-electrochemical (PV-EC) system decreasing the temperature of the photovoltaic-electrochemical (PV-EC) system.

2. The method according to claim 1, wherein a total cell voltage amplitude during the reverse EC operation mode is between 1.5V to 5V.

3. The method according to claim 1, wherein the anodic material is a conductive material with an oxygen evolution reaction (OER) electrocatalyst.

4. The method according to claim 1, wherein the immobilized $CO_2$ reduction electrocatalyst material of the cathodic material is selected from:
   a) a metal with a high overpotential to hydrogen evolution, low CO adsorption and high overpotential for $CO_2$ to $CO_2$ radical ion, selected from the group consisting of Pb, Hg, In, Sn, Cd, Tl and Bi;
b) a metal with a medium overpotential to hydrogen evolution and low CO adsorption, selected from the group consisting of Au, Ag, Zn, Pd and Ga;
c) a metal with a high CO adsorption and a medium overpotential to hydrogen evolution, which is Cu;
d) a metal with a relatively low overpotential to hydrogen evolution and a high CO adsorption, selected from the group consisting of Ni, Fe, Pt, Ti, V, Cr, Mn, Co, Zr, Nb, Mo, Ru, Rh, Hf, Ta, W, Re, and Ir;
e) an oxide of any of the metals of a), b), c) or d) type; or
f) combinations thereof.

5. The method according to claim 1, wherein the immobilized CO2 reduction electrocatalyst material of the cathodic material is selected from the group consisting of Au, Ag, Zn, Pd, Ga, Ni, Fe, Pt, Ti, Ru, Cu, an oxide of any of these metals and combinations thereof, the materials being deposited on a conductive support.

6. The method according to claim 5, wherein the conductive support is a highly porous and conductive support selected from a group consisting of a carbon paper, carbon based nanofibres, a metallic mesh, and a metal foam.

7. The method according to claim 1, wherein the photovoltaic-electrochemical system operates in a bias-free mode.

8. The method according to claim 1, wherein the byproduct species generated and adsorbed on the surface of the cathodic material during the direct EC operation mode are selected from CO and metal carbonyls.

9. A photovoltaic-electrochemical (PV-EC) system comprising at least one photovoltaic (PV) system that generates voltage under irradiation and at least one filter-press type electrochemical cell (EC);
the at least one electrochemical cell comprising:
i) a cathodic compartment which comprises a cathodic material which acts as a cathode electrode and a catholyte, the cathodic material being a conductive electrode with immobilized CO2 reduction electrocatalyst material thereon;
ii) an anodic compartment which comprises an anodic material which acts as an anode electrode and an anolyte; and
iii) an ion-exchange membrane disposed between the cathodic compartment and the anodic compartment;
the at least one photovoltaic system being electrically connected to the anode and cathode electrodes of the at least one electrochemical cell for providing a voltage to the at least one electrochemical cell;
the at least one electrochemical cell being voltage-biased with the at least one photovoltage system;
wherein PV-electrode junctions are shielded from the catholyte and anolyte;
wherein the catholyte flows through both the PV and EC components of the photovoltaic-electrochemical (PV-EC) system decreasing the temperature of the photovoltaic-electrochemical (PV-EC) system; and
wherein the photovoltaic system provides, in the form of pulses of opposite voltage, a first and a second mode of operation, wherein;
a) in the first mode of operation, direct EC operation mode, the photovoltaic system provides a first negative voltage to the at least one electrochemical cell for a first period of time; and
b) in the second mode of operation, reverse EC operation mode, the photovoltaic system provides a second voltage to the at least one electrochemical cell, with opposite polarity to that of the direct EC operation mode, for a second period of time; and with an amplitude of the second voltage of the opposite polarity being at least a minimum amplitude necessary to desorb a byproduct species generated and adsorbed during the direct EC operation mode, and
wherein the photovoltaic system provides the second voltage for a pulse duration resulting in a duty-cycle comprised from 99.9 to 65%.

10. The photovoltaic-electrochemical (PV-EC) system according to claim 9, wherein the anodic material is a conductive material with an oxygen evolution reaction (OER) electrocatalyst.

11. The integrated photovoltaic-electrochemical (PV-EC) system according to claim 9, wherein
a) the cathodic compartment further comprises: (i) a cathode support frame comprising the cathodic material, (ii) at least one distribution frame, and (iii) one or more sealing gaskets;
b) the anodic compartment further-comprises: (i) an anode support frame comprising the anodic material, (ii) at least one distribution frame, and (iii) one or more sealing gaskets; and
wherein the fluid distribution frames and sealing gaskets are arranged such that in use they allow introducing the catholyte or anolyte into the cathodic or anodic compartment through an inlet port and they allow exiting the catholyte or anolyte, respectively, and the products jointly through an outlet port; and
wherein in use, the at least one photovoltaic system provides pulses of opposite polarity to the electrodes such that the cathode auto-regenerates its catalytic activity.

* * * * *